US012566475B2

(12) United States Patent
Ruffini et al.

(10) Patent No.: US 12,566,475 B2
(45) Date of Patent: Mar. 3, 2026

(54) COMMUNICATION SYSTEM HAVING A POWER RAIL

(71) Applicant: TE Connectivity Solutions GmbH, Schaffhausen (CH)

(72) Inventors: Nicholas Paul Ruffini, Lancaster, PA (US); Howard Wallace Andrews, Jr., Hummelstown, PA (US); Robert Neil Mulfinger, Mount Wolf, PA (US); Brian Patrick Costello, Athens, GA (US)

(73) Assignee: TE CONNECTIVITY SOLUTIONS GMBH, Schaffhausen (CH)

( * ) Notice: Subject to any disclaimer, the term of this patent is extended or adjusted under 35 U.S.C. 154(b) by 484 days.

(21) Appl. No.: 18/168,596

(22) Filed: Feb. 14, 2023

(65) Prior Publication Data

US 2024/0272682 A1     Aug. 15, 2024

(51) Int. Cl.
| | |
|---|---|
| *G06F 1/16* | (2006.01) |
| *G06F 1/3206* | (2019.01) |
| *H01R 12/71* | (2011.01) |
| *H01R 12/72* | (2011.01) |
| *H01R 13/502* | (2006.01) |

(52) U.S. Cl.
CPC .......... *G06F 1/1658* (2013.01); *G06F 1/3206* (2013.01); *H01R 12/71* (2013.01); *H01R 12/721* (2013.01); *H01R 13/502* (2013.01)

(58) Field of Classification Search
None
See application file for complete search history.

(56) References Cited

U.S. PATENT DOCUMENTS

| | | | | |
|---|---|---|---|---|
| 2,953,765 A | * | 9/1960 | Greasley | H01R 12/721 439/468 |
| 9,203,165 B2 | * | 12/2015 | Farole | H01R 4/2454 |
| 2009/0291601 A1 | * | 11/2009 | Richter | H01R 4/183 29/882 |

* cited by examiner

*Primary Examiner* — Oscar C Jimenez

(57) ABSTRACT

A power rail for powering a power driver assembly includes a rail member extending between a front end and a rear end. The rail member has a track including a channel between an upper support beam and a lower support beam. The track extends between the front end and the rear end. The track configured to receive a driver circuit card of the power driver assembly. The power rail includes a power contact having a base coupled to the rail member. The power contact includes a cable termination terminated to a power cable. The power contact includes a mating beam extending from the base into the channel. The mating beam has a mating interface configured to be mated to a power pad of the driver circuit card when the driver circuit card is plugged into the track of the rail member.

20 Claims, 7 Drawing Sheets

COMMUNICATION SYSTEM HAVING A POWER RAIL

BACKGROUND OF THE INVENTION

The subject matter herein relates generally to communication systems.

Communication systems include data devices used for data communication between components of the system. For example, network components are used to network communication between the components of the system. Some server or network switches utilize a network interface card to allow communication between various components. The network interface card includes an external connector that connects with an I/O device, such as a transceiver. Typically, communication components within the system are powered devices. Power is typically supplied through power connectors that are mounted to the circuit card to power the components. The power connectors occupy valuable real estate on the circuit card, which increases the overall size or footprint of the circuit card.

A need remains for an improved power supply for components within a communication system.

BRIEF DESCRIPTION OF THE INVENTION

In one embodiment, a power rail for powering a power driver assembly is provided. The power rail includes a rail member extending between a front end and a rear end. The rail member has a track including a channel between an upper support beam and a lower support beam. The track extends between the front end and the rear end. The track configured to receive a driver circuit card of the power driver assembly. The power rail includes a power contact having a base coupled to the rail member. The power contact includes a cable termination terminated to a power cable. The power contact includes a mating beam extending from the base into the channel. The mating beam has a mating interface configured to be mated to a power pad of the driver circuit card when the driver circuit card is plugged into the track of the rail member.

In another embodiment, a power driver assembly for powering a circuit card of a data device is provided. The power driver assembly includes a driver circuit card having an upper surface extending between a front and a rear. The driver circuit card has a first edge and a second edge extending between the front and the rear. The driver circuit card includes a power pad on the upper surface proximate to the first edge. The power driver assembly includes a driver connector mounted to the upper surface proximate to the front. The driver connector includes a connector housing having a card slot at a front of the connector housing configured to receive the circuit card of the data device. The driver connector includes contacts held in the connector housing being terminated to the driver circuit card. The contacts are arranged in the card slot to mate with the circuit card of the data device. The power driver assembly includes a power rail for powering the driver circuit card. The power rail includes a rail member extending between a front end and a rear end. The rail member has a track including a channel between an upper support beam and a lower support beam. The track extends between the front end and the rear end. The track receives the driver circuit card. The power rail includes a power contact having a base coupled to the rail member. The power contact includes a cable termination terminated to a power cable. The power contact includes a mating beam extending from the base into the channel. The mating beam has a mating interface configured to be mated to the power pad of the driver circuit card when the driver circuit card is plugged into the track of the rail member.

In a further embodiment, a communication system is provided and includes a data device having a device circuit card includes a card edge has contact pads at the card edge. The device circuit card includes an electrical component electrically connected to the contact pads. The device circuit card includes a connector module having a separable mating interface configured for mating with a mating electrical connector. The connector module is electrically connected to the electrical component. The communication system includes a power driver assembly for powering the electrical component on the circuit card of the data device. The power driver assembly includes a driver circuit card having an upper surface extending between a front and a rear. The driver circuit card has a first edge and a second edge extending between the front and the rear. The driver circuit card includes a power pad on the upper surface proximate to the first edge. The power driver assembly includes a driver connector mounted to the upper surface proximate to the front. The driver connector includes a connector housing having a card slot at a front of the connector housing. The card slot receives the card edge of the circuit card of the data device. The driver connector includes contacts held in the connector housing being terminated to the driver circuit card. The contacts are arranged in the card slot to mate with the contact pads of the circuit card of the data device. The power driver assembly includes a power rail for powering the driver circuit card. The power rail includes a rail member extending between a front end and a rear end. The rail member has a track including a channel between an upper support beam and a lower support beam. The track extends between the front end and the rear end. The track receives the driver circuit card. The power rail includes a power contact having a base coupled to the rail member. The power contact includes a cable termination terminated to a power cable. The power contact includes a mating beam extending from the base into the channel. The mating beam has a mating interface configured to be mated to the power pad of the driver circuit card when the driver circuit card is plugged into the track of the rail member. The power from the power contact is supplied to the device circuit card through the driver circuit card and the driver connector to power the electrical component on the circuit card of the data device.

DETAILED DESCRIPTION OF THE INVENTION

Figure 1:
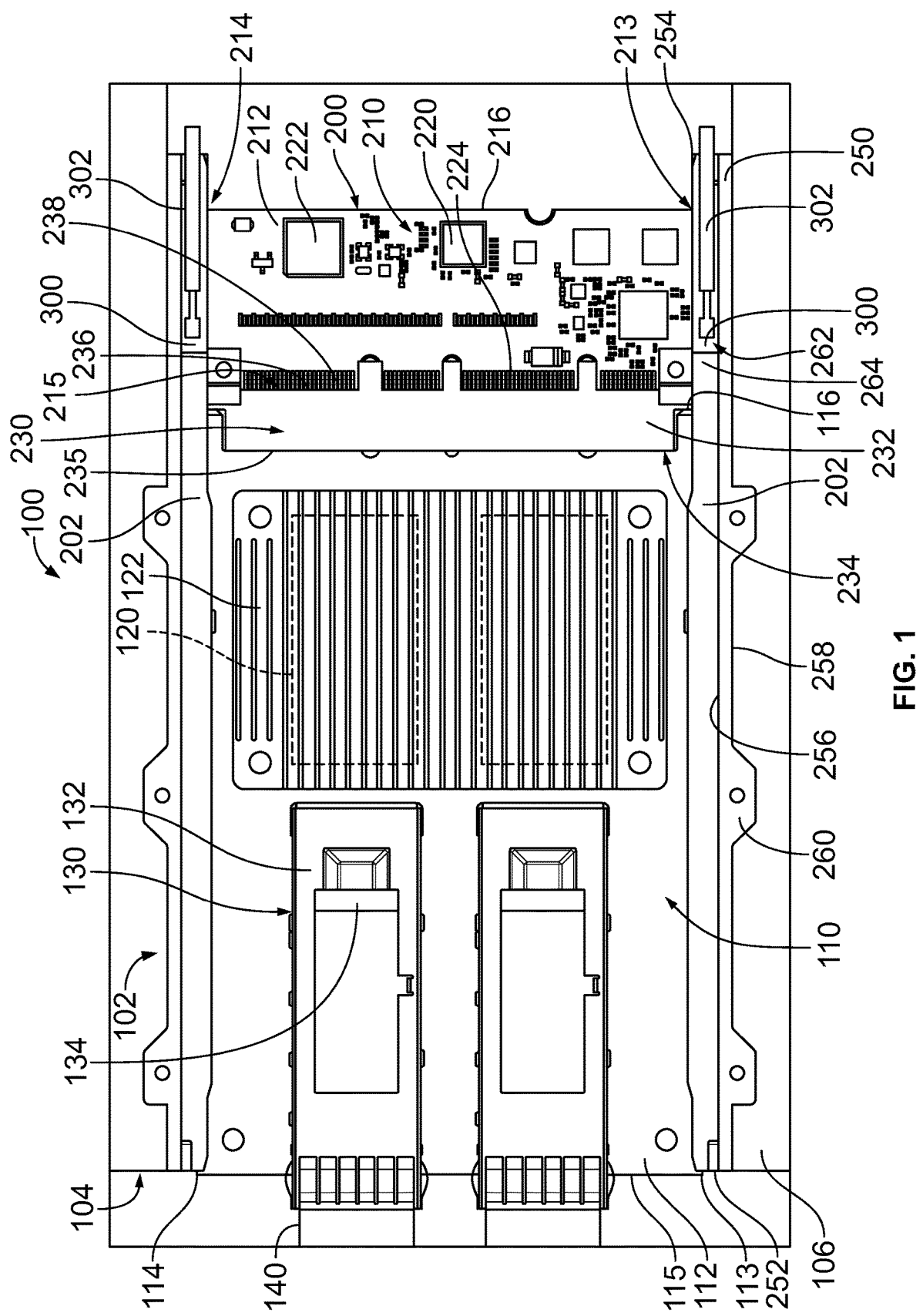
FIG. 1 is a top view of a communication system in accordance with an exemplary embodiment.
Figure 2:
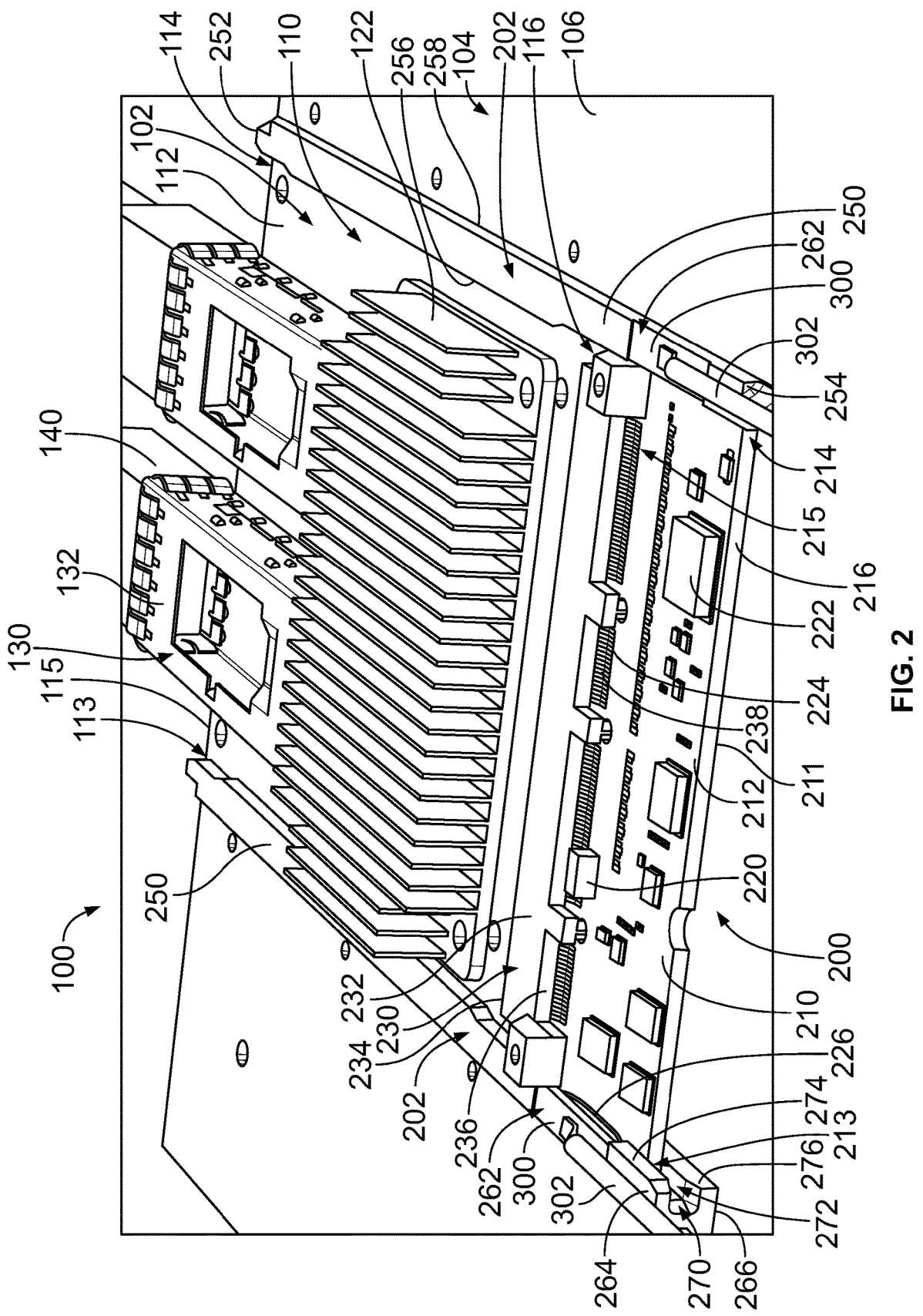
FIG. 2 is a rear perspective view of the communication system in accordance with an exemplary embodiment.

FIG. 1 is a top view of a communication system 100 in accordance with an exemplary embodiment. FIG. 2 is a rear perspective view of the communication system 100 in accordance with an exemplary embodiment. The communication system 100 includes a data device 102 and a power driver assembly 200 for powering the data device 102. In an exemplary embodiment, the power driver assembly 200 includes one or more power rails 202 used to supply power for the communication system 100.

In various embodiments, the data device 102 is a network interface card. Optionally, the network interface card may be an open computer program (OCP) network interface card, such as OCP NIC 3.0. Other types of data devices may be used in alternative embodiments. The data device 102 may be a server or switch component in various embodiments.

In an exemplary embodiment, the data device 102 includes a device circuit card 110, one or more electrical components 120 mounted to the device circuit card 110, and one or more connector modules 130 mounted to the device circuit card 110. The power driver assembly 200 may be used to power the electrical components 120 and/or the connector modules 130. In an exemplary embodiment, the connector modules 130 have separable mating interfaces configured for mating with mating electrical connectors 140 (FIG. 1). For example, the connector modules 130 may be receptacle connectors in the mating electrical connectors 140 may be I/O modules, such as a transceiver modules. Other types of connectors may be used in alternative embodiments to form a mating interface between the data device 102 in an external component.

In an exemplary embodiment, the data device 102 is mounted to a system component 104. In various embodiments, the system component 104 includes a substrate 106. The substrate 106 may be a circuit board, such as a motherboard or host circuit board. The system component 104 may be included within a computer, a network switch, or a server rack. In an exemplary embodiment, the data device 102 is coupled to the substrate 106 using the power rails 202. However, other mounting components may be used in alternative embodiments to secure the data device 102 to the system component 104.

In an exemplary embodiment, the device circuit card 110 includes an upper surface 112 having opposite sides 113, 114 extending between a front edge 115 and a pluggable card edge 116 at a rear of the device circuit card 110. The card edge 116 is configured to be plugged into the power driver assembly 200 to receive power from the power driver assembly 200. In an exemplary embodiment, the sides 113, 114 are received in the power rails 202 to position the device circuit card 110 relative to the power driver assembly 200. The device circuit card 110 may be front loaded into the power rails 202. In an exemplary embodiment, the electrical components 120 and the connector modules 130 are provided on the upper surface 112. Optionally, the electrical components 120 and/or the connector modules 130 may additionally or alternatively be provided on a lower surface opposite the upper surface 112. The connector modules 130 may be provided at or near the front edge 115, such as for receiving the mating electrical connectors 140.

In an exemplary embodiment, the electrical components 120 are mounted directly to the upper surface 112 of the device circuit card 110. The electrical components 120 are electrically connected to conductors, traces, or circuits of the device circuit card 110, such as to electrically connect to each other and/or the connector modules 130 and/or other components mounted to the device circuit card 110. In various embodiments, the electrical component 120 include processors and/or memories and/or other types of electrical components. The electrical components 120 may be connected to contact pads (not shown) at the card edge 116 to electrically connect to the power driver assembly 200. The contact pads may include signal pads and/or ground pads and/or power pads connected to corresponding circuits of the device circuit card 110. In an exemplary embodiment, the data device 102 includes a heatsink 122 thermally coupled to the electrical components 120 to dissipate heat from the electrical component 120. In the illustrated embodiment, the heatsink 122 is a finned heatsink configured to be air cooled. Other types of thermal components may be used in alternative embodiments, such as a cold plate.

In an exemplary embodiment, the connector module 130 is a receptacle module configured to receive the mating electrical connector 140. The connector module 130 includes a cage 132 to provide electrical shielding for the connector module 130 and the mating electrical connector 140. A receptacle connector 134, such as a card edge connector, is located inside the cage 132. The mating electrical connector 140 is configured to be plugged into the cage 132 to mate with the receptacle connector 134. Other types of connector modules 130 may be provided in eternity embodiments.

The power driver assembly 200 includes the power rails 202, a driver circuit card 210, and a driver connector 230 mounted to the driver circuit card 210. The power rails 202 are used to supply power to the driver circuit card 210. The driver circuit card 210 transfers the power supply to the driver connector 230. The driver connector 230 receives the pluggable card edge 116 of the data device 102 to supply the power to the data device 102.

In an exemplary embodiment, each power rail 202 includes a power contact 300 coupled thereto. A power cable 302 supplies power to the power contact 300. The power contact 300 interfaces with the driver circuit card 210 at a separable mating interface. The power contact 300 has a low-profile. For example, the power contact 300 may be contained within the envelope of the power rail 202 to provide a compact power supply for the power driver assembly 200 and the data device 102. The power rails 202 efficiently deliver power to the driver circuit card 210, and thus the device circuit card 110, without the need for a bulky power connector mounted to the driver circuit card 210, which is typical of conventional systems. Elimination of the bulky power connector opens real estate on the driver circuit card 210 for other electrical components and/or allows the overall size of the driver circuit card 210 to be reduced, which reduces the overall envelope or footprint of the communication system 100.

Each power rail 202 includes a rail member 250 extending between a front end 252 and a rear end 254. The rail member 250 extends between an inner side 256 and an outer side 258. The rail member 250 has a length between the front end 252 and the rear end 254. The rail member 250 has a width between the inner side 256 and the outer side 258. In an exemplary embodiment, the rail member 250 includes mounting tabs 260 extending from the outer side 258. The mounting tabs 260 are used to mount the rail member 250 to the substrate 106, such as using fasteners. In an exemplary embodiment, the rail member 250 includes a power contact pocket 262 that receives the corresponding power contact 300. In the illustrated embodiment, the power contact pocket 262 is located proximate to the rear end 254. Other locations are possible in alternative embodiments. Optionally, multiple power contact pockets 262 may be provided along the rail member 250, such as being longitudinally offset along the length of the rail member 250 or being vertically offset, such as being provided at a top 264 and a bottom 266 of the rail member 250. The multiple power contact pockets 262 receive corresponding power contacts 300.

In an exemplary embodiment, the power rail 202 includes a track 270 configured to receive the driver circuit card 210 and/or the device circuit card 110. The track 270 includes a channel 272 between an upper support beam 274 and a lower support beam 276. The channel 272 is provided at the inner side 256. In an exemplary embodiment, the track 270 extends the entire length of the rail member 250. For example, the channel 272 is open at the front end 252 to receive the device circuit card 110 and is open at the rear end 254 to receive the driver circuit card 210. Optionally, a stop wall may extend into the channel 272 two divide the channel 272 into a front channel and a rear channel configured to receive the device circuit card 110 and the driver circuit card 210, respectively. In other embodiments, the stop wall may be provided at the front end 252 such that both the device circuit card 110 and the driver circuit card 210 are both configured to be rear loaded into the channel 272 through the rear end 254. Alternatively, the stop wall may be provided at the rear end 254 such that both the device circuit card 110 in the driver circuit card 210 are both configured to be front loaded into the channel 272 through the front end 252.

The driver circuit card 210 includes a lower surface 211 and an upper surface 212 having opposite sides 213, 214 extending between a front edge 215 and a rear edge 216. In the illustrated embodiment, the driver connector 230 is provided at the front edge 215. For example, the driver connector 230 may extend forward of the front edge 215. In an exemplary embodiment, the sides 213, 214 are received in the channels 272 of the power rails 202 to position the driver circuit card 210 relative to the device circuit card 110. The driver circuit card 210 may be rear loaded into the power rails 202.

In an exemplary embodiment, electrical components 220 are provided on the upper surface 212 and/or the lower surface 211. The electrical components 220 may include capacitors, resistors, diodes, processors, memories, or other types of electrical components. In an exemplary embodiment, the electrical components 220 include a control unit or driver 222 that controls operation of the data device 102. The electrical components 220 are electrically connected to contact pads 224 proximate to the front edge 215 of the driver circuit card 210. The driver connector 230 is electrically connected to the contact pads 224. The contact pads 224 may include signal contact pads and/or ground contact pads. In an exemplary embodiment, various contact pads 224 include power contact pads used to supply power to the driver connector 230. The power contact pads are electrically connected to power pads 226, 228 at the first and second sides 213, 214 of the driver circuit card 210. The power pads 226, 228 are configured to be electrically connected to the corresponding power contacts 300 associated with the power rails 202. The power contacts 300 supply power to the driver circuit card 210 through the power pads 226, 228. The power pads 226, 228 are provided at the extreme outer edges of the driver circuit card 210 at the sides 213, 214, leaving the remaining surface area between the sides 213, 214 open for other circuits and electrical components 220.

The driver connector 230 is coupled to the driver circuit card 210. In an exemplary embodiment, the driver connector 230 is coupled to the contact pads 224 at the upper surface 212 of the driver circuit card 210. In an exemplary embodiment, the driver connector 230 extends forward of the front edge 215 of the driver circuit card 210. In an exemplary embodiment, the driver connector 230 extends above the upper surface 212 and below the lower surface 211 to receive the device circuit card 110, which is co-planer with the driver circuit card 210.

In an exemplary embodiment, the driver connector 230 includes a connector housing 232 having a card slot 234 at a front 235 of the connector housing 232. The card slot 234 receives the pluggable card edge 116 of the device circuit card 110. The connector housing 232 holds a plurality of contacts 238, which extend into the card slot 234 to mate with the device circuit card 110. The contacts 238 extend from a rear 236 of the connector housing 232 for termination to the contact pads 224 of the driver circuit card 210. For example, the contacts 238 may be soldered to the contact pads 224. In an exemplary embodiment, the card slot 234 is located forward of the front edge 215 of the driver circuit card, being coplanar with the driver circuit card 210 to receive the device circuit card 110. Other configurations are possible in alternative embodiments, such as with the card slot being offset or non-coplanar with the driver circuit card 210. In other various embodiments, the driver connector 230 may be a right angle card edge connector configured to receive the device circuit card 110 in a perpendicular orientation relative to the driver circuit card 210.

Figures 3, 4:
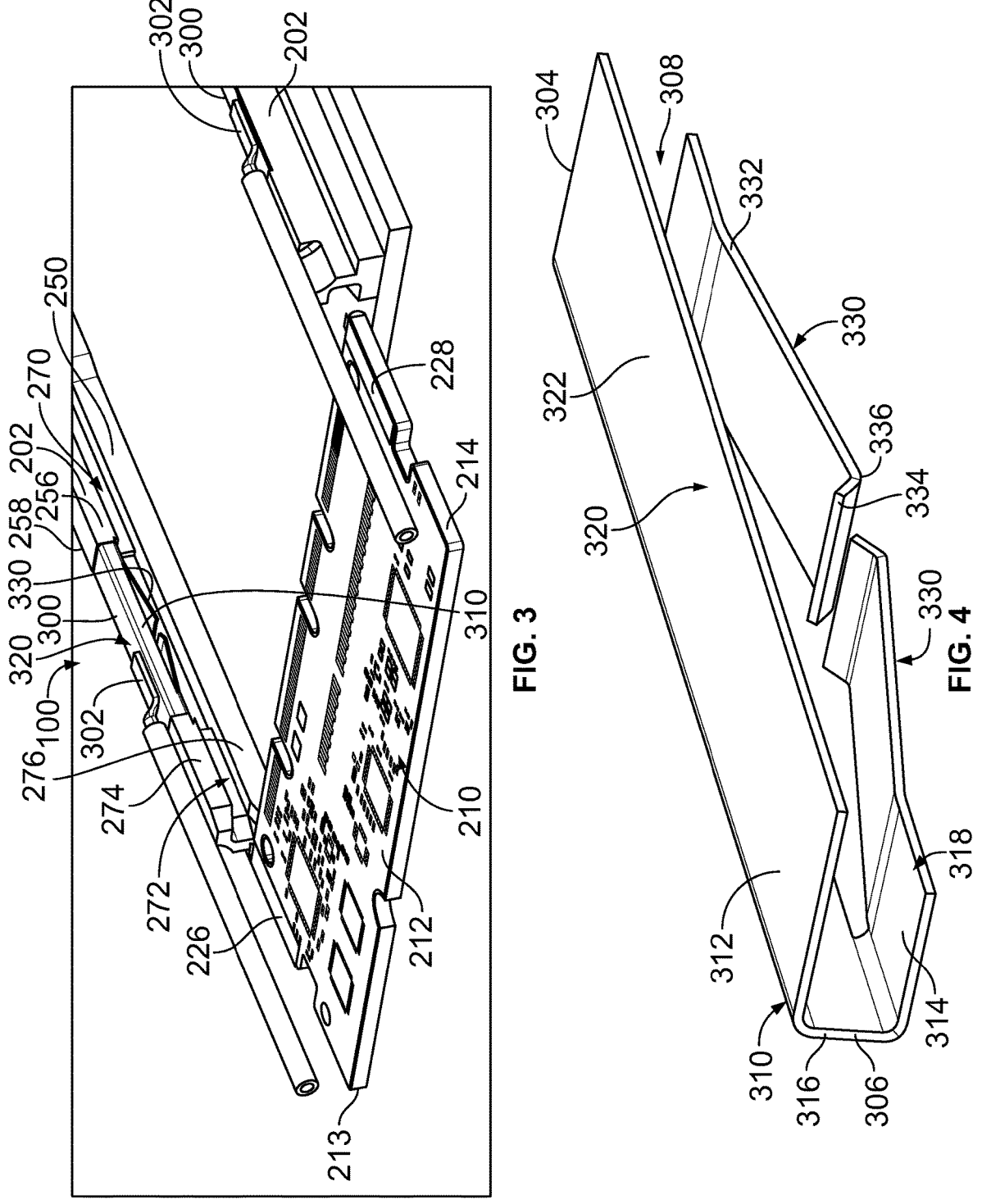
FIG. 3 is a rear perspective view of a portion of the communication system showing the driver circuit card relative to the power rails in accordance with an exemplary embodiment.
FIG. 4 is a perspective view of the power contacts in accordance with an exemplary embodiment.

FIG. 3 is a rear perspective view of a portion of the communication system 100 showing the driver circuit card 210 relative to the power rails 202. FIG. 3 shows the driver circuit card 210 poised for loading into the tracks 270 of the power rails 202. The data device 102 and the driver connector 230 are removed in FIG. 3 to illustrate other components of the communication system 100, such as the driver circuit card 210 and the power contacts 300.

During assembly, the driver circuit card 210 is aligned with the tracks 270 in the real members 250. The driver circuit card 210 is configured to be plugged into the channels 272 between the upper support beams 274 and the lower support beams 276. The support beams 274, 276 position the driver circuit card 210, such as to align the driver circuit card 210 with the device circuit card 110 (shown in FIG. 2).

In an exemplary embodiment, the driver circuit card 210 includes the power pads 226, 228 along the sides 213, 214 of the driver circuit card 210. The power pads 226, 228 are provided at the upper surface 212. In an exemplary embodiment, the power pads 226, 228 are located outside of the footprint of the driver connector 230 the power pads 226, 228 may be contained within areas of the driver circuit card 210 that are located within the tracks 270. For example, the power pads 226, 228 may have widths approximately equal to widths of the channels 272. Locating the power pads 226, 228 at the extreme outer edges of the driver circuit card 210 leaves ample surface area on the upper surface 212 four traces and mounting areas for the various electrical components 220 (shown in FIG. 2). For example, conventional systems may utilize approximately 10% of the surface area of the driver circuit card dedicated to a power connector mounted to the driver circuit card. By shifting the power pads 226, 228 to the outer edges of the driver circuit card 210, into areas that are otherwise unusable as being located within the tracks 270, frees up real estate on the driver circuit card 210 for additional electrical components and/or allows reduction in overall size (for example, reduction in front-to-rear length) of the driver circuit card 210 compared to conventional driver circuit cards.

With additional reference to FIG. 4, which is a perspective view of the power contacts 300 in accordance with an exemplary embodiment, the power contacts 300 are coupled to the real members 250 and configured to be electrically connected to the corresponding power pads 226, 228. Each power contact 300 includes a base 310, a cable termination 320, and at least one mating beam 330. The base 310 is configured to be coupled to the rail member 250. The cable termination 320 is configured to be coupled to the power cable 302. The mating beam 330 is configured to be coupled to the power pad 226, 228 of the driver circuit card 210.

The power contact 300 extends between a front 304 and a rear 306. The power contact 300 includes a cavity 308 between the front 304 and the rear 306. The cavity 308 receives a portion of the power rail 202, such as the upper support beam 274. In an exemplary embodiment, the power contact 300 is manufactured from a metal material, such as aluminum or copper. In various embodiments, the power contact 300 is a stamped and formed contact. In the illustrated embodiment, the base 310 is C-shaped having an upper wall 312, a lower wall 314, and an end wall 316 between the upper wall 312 and the lower wall 314. Optionally, the upper wall 312 may be parallel to the lower wall 314. The end wall 316 may be perpendicular to the upper wall 312 and/or the lower wall 314. In an exemplary embodiment, an opening 318 is provided between the upper wall 312 and the lower wall 314 that is open to the cavity 308. The cavity 308 is located between the upper wall 312 and the lower wall 314.

In an exemplary embodiment, the cable termination 320 is provided at a top of the power contact 300. For example, the cable termination 320 may be provided at an exterior of the upper wall 312. In an exemplary embodiment, the cable termination 320 includes a termination pad 322. The termination pad 322 is defined by the exterior surface of the upper wall 312. The termination pad 322 may be provided at other locations in alternative embodiments, such as along the end wall 316. The power cable 302 is configured to be terminated to the termination pad 322. For example, the power cable 302 may be welded, such as ultrasonically welded, or soldered to the termination pad 322. Other types of terminations may be provided in alternative embodiments. In other alternative embodiments, the cable termination 320 may include a crimp barrel and the power cable 302 may be crimped to the cable termination 320 at the crimp barrel. In other alternative embodiments, the cable termination 320 may include a blade or tab extending therefrom configured to be plugged into a socket contact provided at the end of the power cable 302. In other alternative embodiments, the cable termination 320 may include a socket contact extending therefrom configured to receive a blade contact provided at the end of the power cable 302.

In an exemplary embodiment, the power contact 300 and the power cable 302 have a low profile for the power driver assembly 200. For example, the power cable 302 may be routed along the upper surface of the rail member 250, such as along the upper support beam 274. Other routing locations are possible in alternative embodiments, such as along the side, the bottom, or internally. As such, the power cable 302 has a small impact on the overall height of the power driver assembly 200. For example, the impact on the overall height is limited to the diameter of the power cable 302. In various embodiments, other components of the power driver assembly 200, such as the driver connector 230 may extend at least as tall as the power cable 302, such that the power cable 302 does not increase the overall height of the power driver assembly 200. In an exemplary embodiment, the power contact 300 is coupled to the rail member 250 in a manner that has very little or no impact on the overall height and/or width of the power rail 202. For example, the power contact 300 may be received in the power contact pocket 262 such that the power contacts 300 is flush with or recessed into the rail member 250. For example, the upper wall 312 may be flush with or recessed below the upper surface of the upper support beam 274. The end wall 316 may be flush with or recessed into the inner surface 256 of the rail member 250. The lower wall 314 and the mating beams 330 are located within the channel 272 and do not impact the overall height of the power driver assembly 200. In an exemplary embodiment, the power contact 300 is contained within an envelope (for example, height and width) of the rail member 250. For example, the width of the power contact 300 (between the end wall 316 and the opening 318) may be less than or equal to the width of the rail member 250 between the inner surface 256 and the outer surface 258. As such, the power contact 300 does not add to the overall dimensions of the power rail 202.

In an exemplary embodiment, the power contact 300 includes a pair of the mating beams 330. However, the power contact 300 may include greater or fewer mating beams 330 in alternative embodiments. Each mating beam 330 extends from the base 310. In the illustrated embodiment, the mating beam 330 extends from the lower wall 314. For example, the mating beam 330 may be stamped from the lower wall 314. The mating beam 330 extends between a proximal end 332 and a distal end 334. The mating beam 330 is flexible and deflectable relative to the base 310. For example, during mating with the power pad 226, 228, the mating beam 330 may be deflected, such as in an upward deflection direction. In the illustrated embodiment, the mating beam 330 is a cantilevered beam. For example, the mating beam 330 is supported at one end, namely the proximal end 332. The distal ends 334 is free to deflect against the power pad 226, 228. The mating beam 330 includes a mating interface 336 between the proximal end 332 and the distal end 334 configured to engage the power pad 226, 228. In an exemplary embodiment, the mating interface 336 is provided proximate to the distal ends 334. For example, the mating beam 330 may be curved at the distal end 334 two define the mating interface 336. In alternative embodiments, the mating beam 330 may be a simply supported beam, such as having both the proximal end 332 and the distal end 334 supported by the base 310 or other structure, such as the rail member 250. In the illustrated embodiment, the mating beams 330 extend toward each other. For example, the distal ends 334 of the pair of the mating beams 330 are located adjacent one another and the proximal ends 332 are located from each other. For example, the proximal ends 332 of the pair of the mating beams 330 are located proximate to the front 304 and the rear 306.

When assembled, the driver circuit card 210 is plugged into the power rails 202. The power pads 226, 228 at the sides 213, 214 interface with the mating beams 330 of the power contacts 300. The pair of the mating beams 330 define multiple points of contact with each power pad 226, 228 to increase the current carrying capacity of the power contact 300 by providing parallel paths for the power circuit. The mating beams 330 are configured to be spring loaded against the power pads 226, 228 to ensure a reliable electrical connection between the power contacts 300 and the power pads 226, 228.

Figures 5, 6:
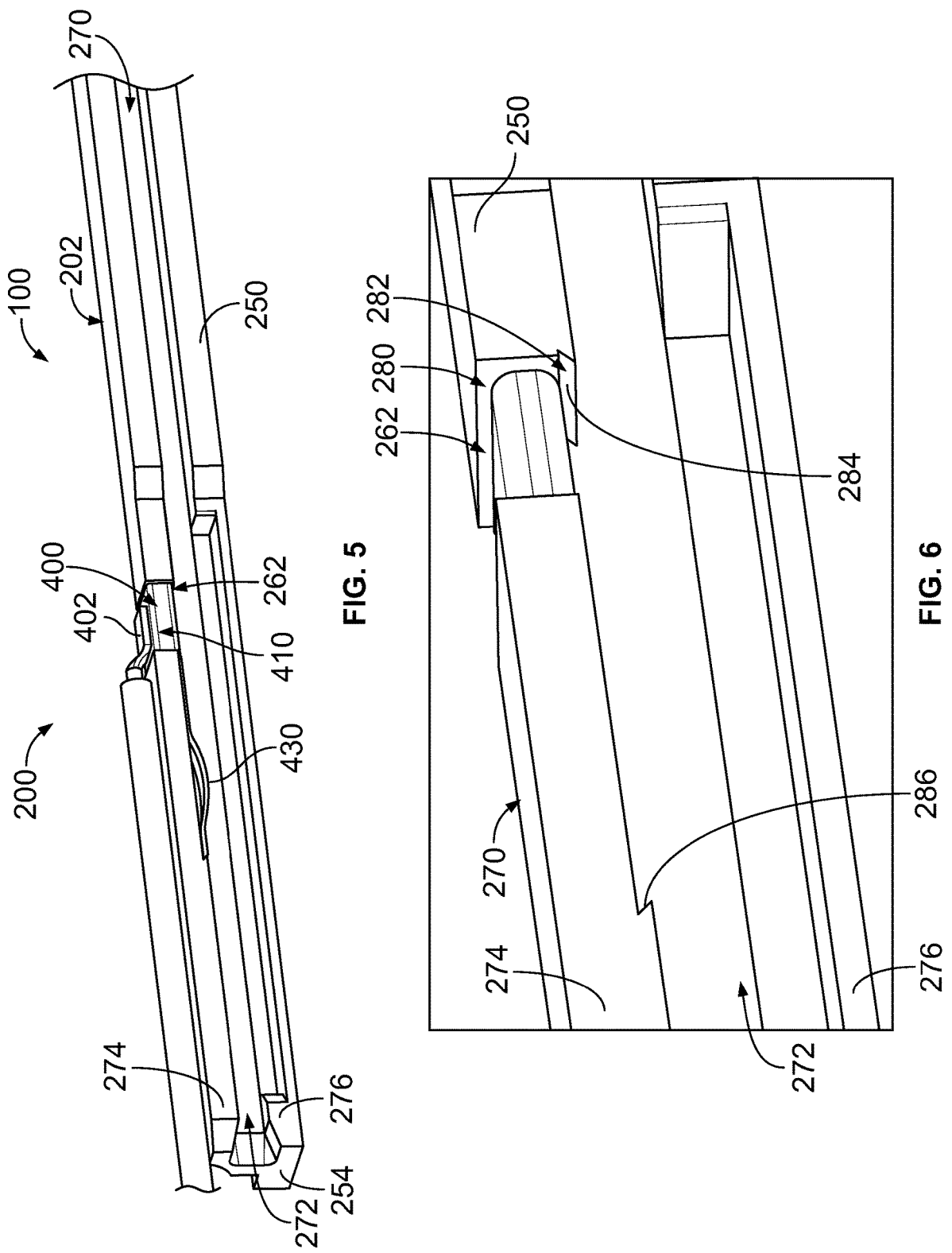
FIG. 5 is a rear perspective view of a portion of the communication system showing one of the power rails with a power contact in accordance with an exemplary embodiment.
FIG. 6 is a perspective view of a portion of the rail member, the rail member includes the power contact pocket along the rail member in accordance with an exemplary embodiment.

FIG. 5 is a rear perspective view of a portion of the communication system 100 showing one of the power rails 202 with a power contact 400 in accordance with an exemplary embodiment. The power contact 400 is coupled to the rail member 250. A power cable 402 supplies power to the power contact 400. The power contact 400 has a low-profile. For example, the power contact 400 may be contained within the envelope of the power rail 202 to provide a compact power supply for the power driver assembly 200 and the data device 102 (both shown in FIG. 2). The power contact 400 is similar to the power contact 300; however, the power contact 400 may be shaped differently than the power contact 300. The rail member 250 may have different features (for example, a differently shaped power contact pocket 262) to receive the power contact 400.

With additional reference to FIG. 6, which is a perspective view of a portion of the rail member 250, the rail member 250 includes the power contact pocket 262 along the rail member 250. The power contact pocket 262 is located along the track 270, such as proximate to the rear end 254 of the rail member 250. The track 270 includes the channel 272 between the upper support beam 274 and the lower support beam 276. In an exemplary embodiment, the power contact pocket 262 is formed in the upper support beam 274 such that the power contact 400 is coupled to the upper support beam 274.

The power contact pocket 262 is sized and shaped to receive the power contact 400. The power contact pocket 262 includes a base pocket 280 and a beam pocket 282. The base pocket 280 receives a base 410 of the power contact 400. The beam pocket 282 receives a mating beam 430 of the power contact 400. The base pocket 280 is formed in the upper support beam 274. The base pocket 280 extends along the top of the upper support beam 274, along the inner side of the upper support beam 274, and along the bottom of the upper support beam 274. The base pocket 280 allows the base 410 of the power contact 400 to be recessed within the rail member 250. The beam pocket 282 is formed in the upper support beam 274. The beam pocket 282 extends along the bottom of the upper support beam 274 to allow the mating beam 430 to interface with the driver circuit card 210 in the channel 272. The beam pocket 282 includes a front ledge 284 configured to support a front of the power contact 400 and a rear ledge 286 configured to support a rear of the power contact 400. For example, the front ledge 284 supports the base 410 of the power contact 400 and the rear ledge 286 supports the distal end of the mating beam 430.

Figure 7:
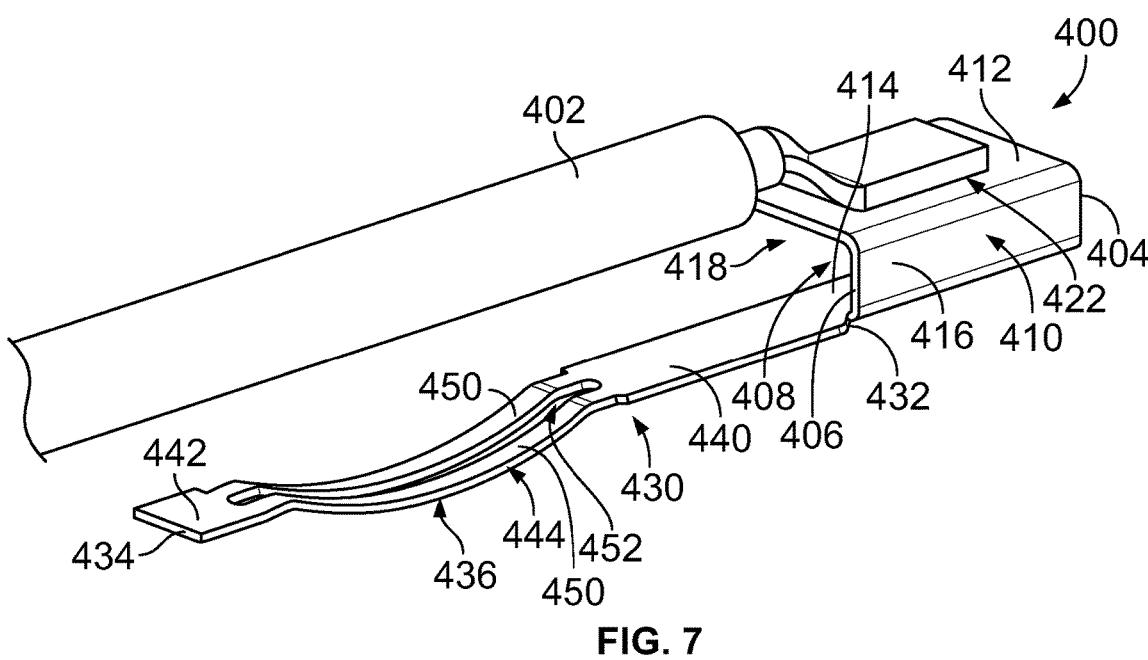
FIG. 7 is a perspective view of the power contact and the power cable in accordance with an exemplary embodiment.

FIG. 7 is a perspective view of the power contact 400 and the power cable 402 in accordance with an exemplary embodiment. The power contact 400 includes the base 410, a cable termination 420, and the mating beam 430. The power cable 402 is coupled to the power contact 400 at the cable termination 420. For example, the cable termination 420 includes a termination pad 422 and the power cable 402 is terminated to the cable termination 420 at the termination pad 422, such as being welded or soldered to the termination pad 422. However, other types of cable connections may be used in alternative embodiments to mechanically and electrically connect the power cable 402 to the power contact 400.

In an exemplary embodiment, the power contact 400 is a stamped and formed contact. The mating beam 430 extends from the base 410. The base 410 extends between a front 404 and a rear 406. The power contact 400 includes a cavity 408 between the front 404 and the rear 406. In the illustrated embodiment, the base 410 is C-shaped having an upper wall 412, a lower wall 414, and an end wall 416 between the upper wall 412 and the lower wall 414. In an exemplary embodiment, an opening 418 is provided between the upper wall 412 and the lower wall 414 that is open to the cavity 408. The cavity 408 is located between the upper wall 412 and the lower wall 414.

The mating beam 430 extends from the base 410. For example, the mating beam 430 extends rearward from the lower wall 414, such as at the rear 406. The mating beam 430 extends between a proximal end 432 and a distal end 434. The mating beam 430 is flexible and deflectable relative to the base 410. In an exemplary embodiment, the mating beam 430 includes a front support pad 440 at the proximal end 432 and a rear support pad 442 at the distal end 434. The front and rear support pads 440, 442 are configured to engage the rail member 250 to support the mating beam 430 at both the proximal end 432 and the distal end 434. A bowed portion 444 is defined between the front and rear support pads 440, 442. The bowed portion 444 is bent or curved out of plane relative to the front and rear support pads 440, 442 to interface with the driver circuit card 210. The bowed portion 444 defines a mating interface 436 of the mating beam 430. The bowed portion 444 is free to deflect against the driver circuit card 210 when mated thereto. In an exemplary embodiment, the mating beam 430 includes a plurality of beam sections 450 separated by a slot(s) 452. The beam sections 450 and the slot(s) 452 are stamped and formed with the power contact 400. The beam sections 450 extend parallel to each other. The beam sections 450 generally extend along the bowed portion 444 between the front and rear support pads 440, 442. The beam sections 450 are independently movable relative to each other. The beam sections 450 define multiple points of contact with the driver circuit card 210.

Figure 8:
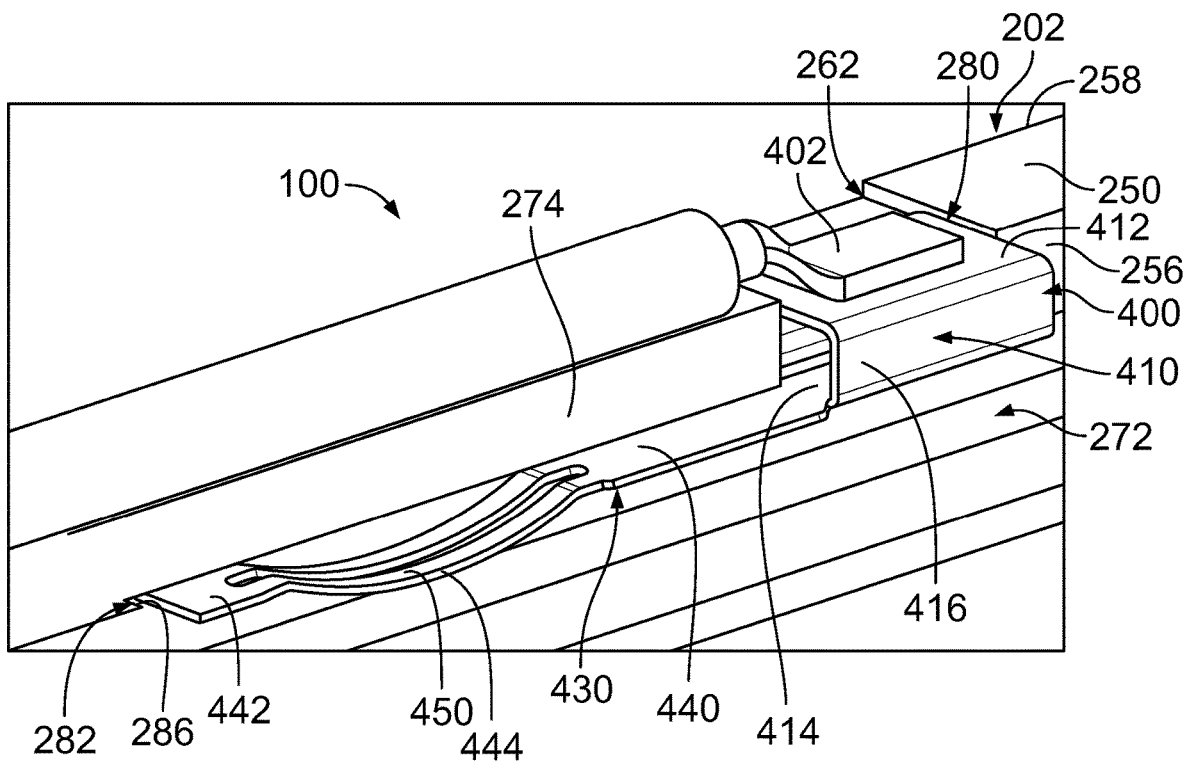
FIG. 8 is a rear perspective view of a portion of the communication system showing the power contact poised for coupling to the rail member in accordance with an exemplary embodiment.
Figures 9, 10:
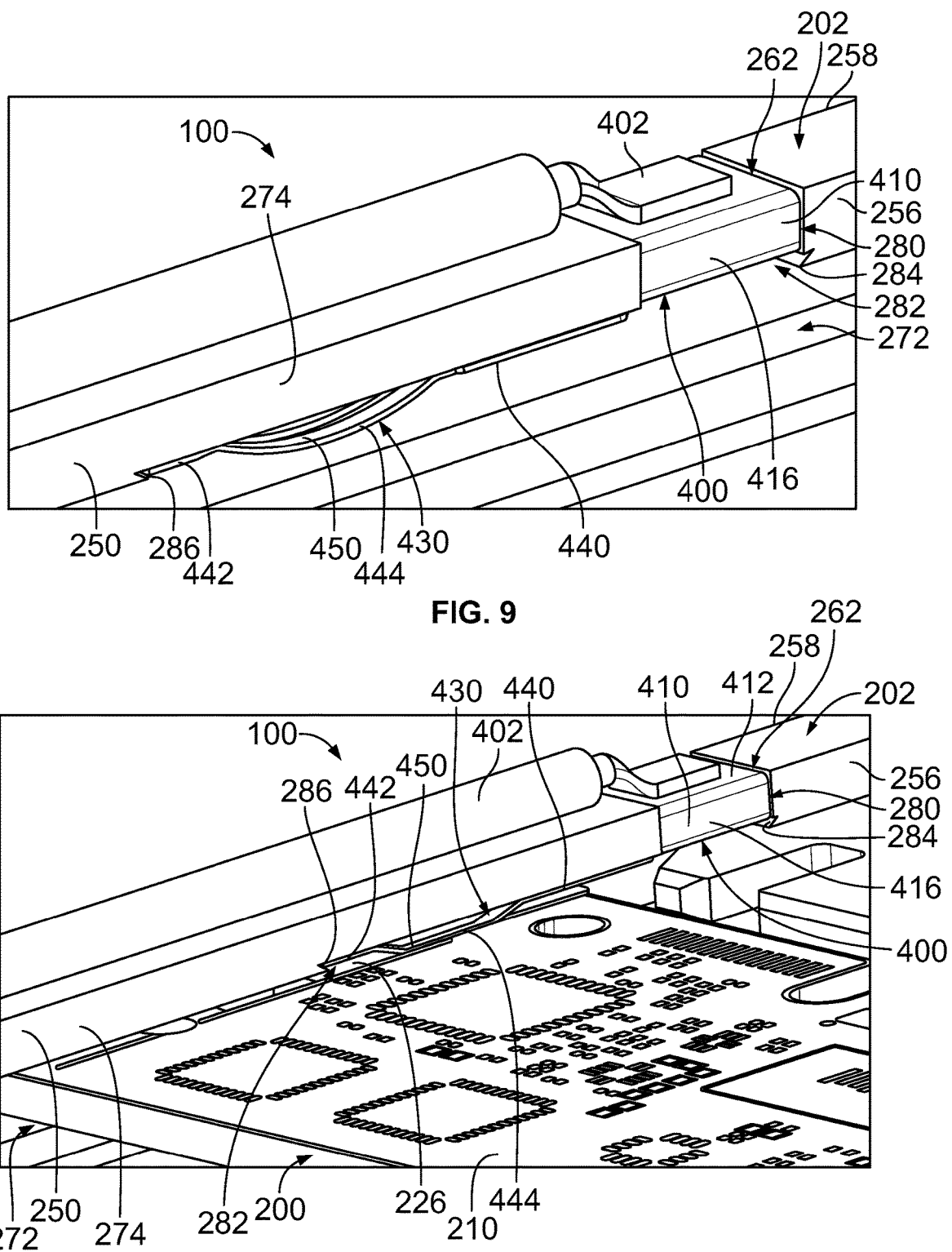
FIG. 9 is a rear perspective view of a portion of the communication system showing the power contact coupled to the rail member in accordance with an exemplary embodiment.
FIG. 10 is a rear perspective view of a portion of the communication system showing the power contact electrically connected to the driver circuit card in accordance with an exemplary embodiment.

FIG. 8 is a rear perspective view of a portion of the communication system 100 showing the power contact 400 poised for coupling to the rail member 250 in accordance with an exemplary embodiment. FIG. 9 is a rear perspective view of a portion of the communication system 100 showing the power contact 400 coupled to the rail member 250 in accordance with an exemplary embodiment. FIG. 10 is a rear perspective view of a portion of the communication system 100 showing the power contact 400 electrically connected to the driver circuit card 210 in accordance with an exemplary embodiment.

During assembly, the power contact 400 is coupled to the rail member 250, such as to the upper support beam 274. The power contact 400 is plugged into the power contact pocket 262. For example, the base 410 is received in the base pocket 280 and the mating beam 430 is received in the beam pocket 282. The front support pad 440 is supported against the bottom of the upper support beam 274 and the rear support pad 442 is supported against the bottom of the upper support beam 274. The bowed portion 444 of the mating beam 430 extends into the channel 272 to interface with the driver circuit card 210. In various embodiments, the power contact 400 may be held in the power contact pocket 262 by an interference fit, such as using the front and rear ledges 284, 286. Alternatively, the power contact 400 may be secured in the power contact pocket 262 using adhesive, fasteners, latches, clips, or other securing features.

In an exemplary embodiment, the power contact 400 and the power cable 402 have a low profile for the power driver assembly 200. For example, the power cable 402 may be routed along the upper surface of the rail member 250, such as along the upper support beam 274. Other routing locations are possible in alternative embodiments, such as along the side, the bottom, or internally. As such, the power cable 402 has a small impact on the overall height of the power driver assembly 200. For example, the impact on the overall height is limited to the diameter of the power cable 402. In an exemplary embodiment, the power contact 400 is coupled to the rail member 250 in a manner that has very little or no impact on the overall height and/or width of the power rail 202. For example, the power contact 400 may be received in the power contact pocket 262 such that the power contacts 400 is flush with or recessed into the rail member 250. For example, the upper wall 412 may be flush with or recessed below the upper surface of the upper support beam 274. The end wall 416 may be flush with or recessed into the inner surface 256 of the rail member 250. The lower wall 414 and the mating beams 430 are located within the channel 272 and do not impact the overall height of the power driver assembly 200. In an exemplary embodiment, the power contact 400 is contained within an envelope (for example, height and width) of the rail member 250. For example, the width of the power contact 400 (between the end wall 416 and the opening 418) may be less than or equal to the width of the rail member 250 between the inner surface 256 and the outer surface 258. As such, the power contact 400 does not add to the overall dimensions of the power rail 202.

When assembled, the driver circuit card 210 is plugged into the power rail 202. The power pad 226 interfaces with the mating beam 430 of the power contacts 400. The beam sections 450 of the mating beam 430 define multiple points of contact with each power pad 226. The beam sections 450 of the mating beam 430 are configured to be spring loaded against the power pad 226 to ensure a reliable electrical connection between the power contact 400 and the power pad 226.

Figure 11:
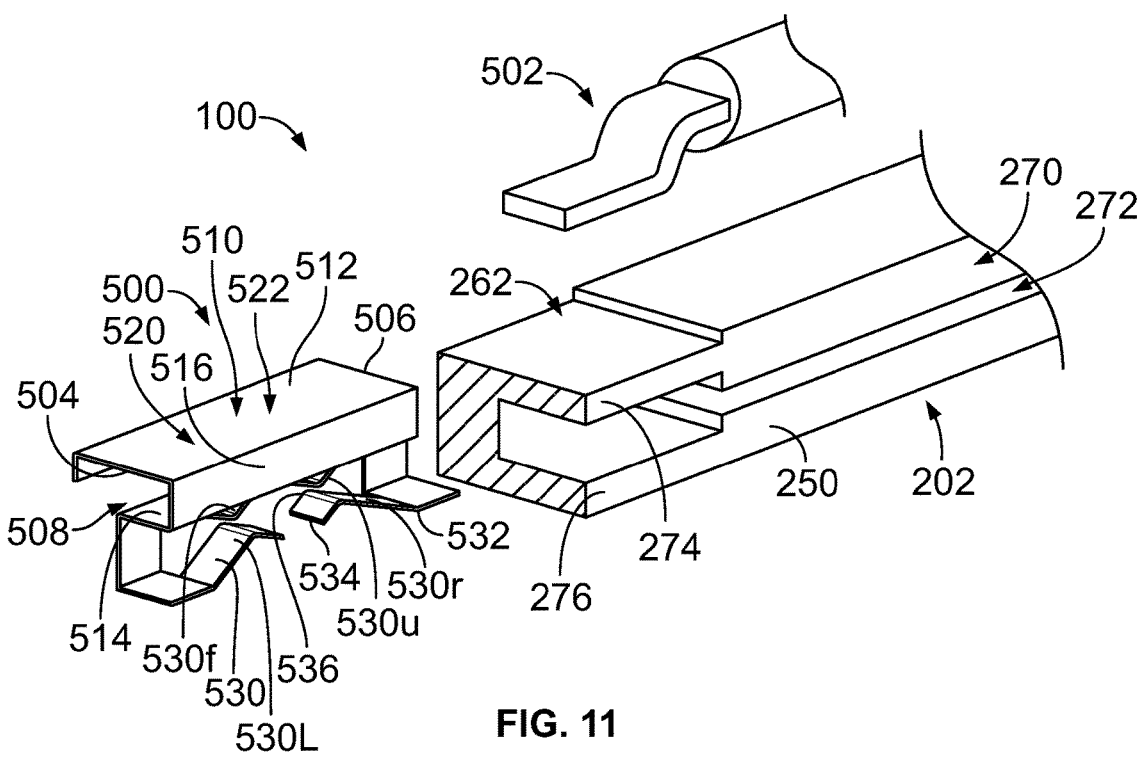
FIG. 11 is a perspective, partial sectional view of a portion of the communication system showing one of the power rails with a power contact in accordance with an exemplary embodiment.
Figure 12:
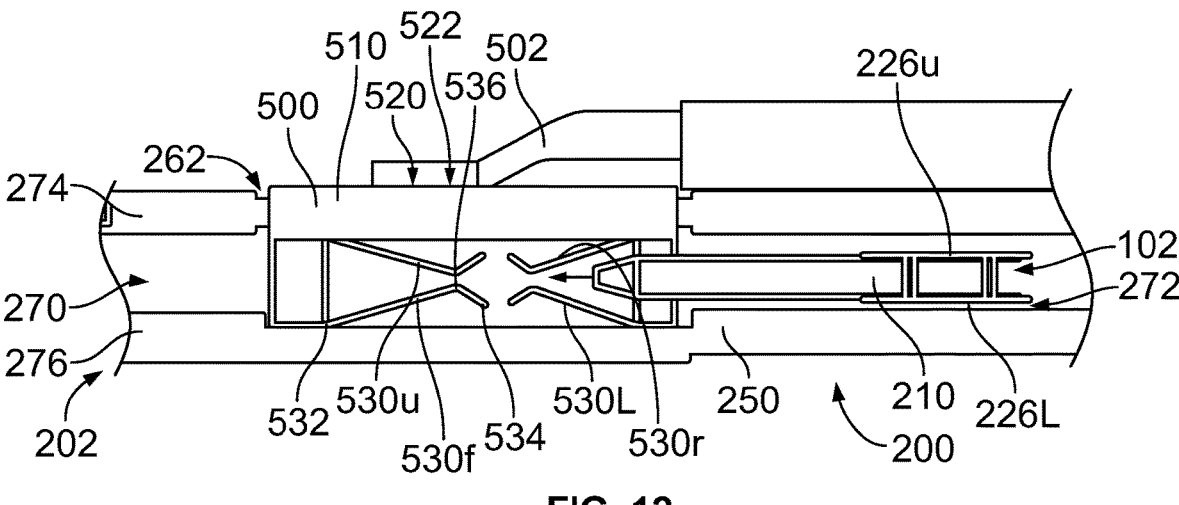
FIG. 12 is a side view of a portion of the communication system showing one of the power rails with the power contact in accordance with an exemplary embodiment.

FIG. 11 is a perspective, partial sectional view of a portion of the communication system 100 showing one of the power rails 202 with a power contact 500 in accordance with an exemplary embodiment. FIG. 12 is a side view of a portion of the communication system 100 showing one of the power rails 202 with the power contact 500 in accordance with an exemplary embodiment coupled to the rail member 250.

The power contact 500 is coupled to the rail member 250. A power cable 502 supplies power to the power contact 500. The power contact 500 has a low-profile. For example, the power contact 500 may be contained within the envelope of the power rail 202 to provide a compact power supply for the power driver assembly 200 (FIG. 12) and the data device 102 (shown in FIG. 2). The power contact 500 is similar to the power contact 300; however, the power contact 500 may be shaped differently than the power contact 300. The rail member 250 may have different features (for example, a differently shaped power contact pocket 262) to receive the power contact 500.

The rail member 250 includes the power contact pocket 262 along the rail member 250. The power contact pocket 262 is located along the track 270. The track 270 includes the channel 272 between the upper support beam 274 and the lower support beam 276. In an exemplary embodiment, the power contact pocket 262 is formed in the upper support beam 274 and the lower support beam 276. The power contact pocket 262 is sized and shaped to receive the power contact 500.

The power contact 500 includes a base 510, a cable termination 520, and a plurality of mating beam 530. The power cable 502 is coupled to the power contact 500 at the cable termination 520. For example, the cable termination 520 includes a termination pad 522 and the power cable 502 is terminated to the cable termination 520 at the termination pad 522, such as being welded or soldered to the termination pad 522. However, other types of cable connections may be used in alternative embodiments to mechanically and electrically connect the power cable 502 to the power contact 500.

In an exemplary embodiment, the power contact 500 is a stamped and formed contact. The mating beams 530 extends from the base 510. The base 510 extends between a front 504 and a rear 506. The power contact 500 includes a cavity 508 between the front 504 and the rear 506. The base 510 includes an upper wall 512, a lower wall 514, and an end wall 516 between the upper wall 512 and the lower wall 514. The cavity 508 is located between the upper wall 512 and the lower wall 514.

The mating beams 530 extend from the base 510. In an exemplary embodiment, the power contact 500 includes a front mating beam(s) 530f and a rear mating beam(s) 530r. The front mating beam(s) 530f are located proximate to the front 504 and extend rearwardly. The rear mating beam(s) 530r are located proximate to the rear 506 and extend forwardly. In the illustrated embodiment, the mating beams 530 of the power contact 500 include a pair of the front mating beams 530f and a pair of the rear mating beams 530r. The matin beams 530f, 530r define multiple points of contact with the corresponding power pad 226 on the driver circuit card 210. Having both mating beams 530, facing in opposite direction, reduces the chance of stubbing on the leading edge of the driver circuit card during mating. In an exemplary embodiment, the mating beams 530 of the power contact 500 include an upper mating beam(s) 530u configured to extend along the upper support beam 274 and a lower mating beam(s) 530l configured to extend along the lower support beam 276. In the illustrated embodiment, the mating beams 530 of the power contact 500 include a pair of the upper mating beams 530u and a pair of the lower mating beams 530l. The driver circuit card 210 is configured to be centered between the upper mating beams 530u and the lower mating beams 530l. The upper mating beams 530u and the lower mating beams 530l are configured to be mated with the upper power pad 226u and the lower power pad 226l, respectively. The upper and lower mating beams 530u and 530l reduced deflection needed due to the force balance from both sides of the driver circuit card 210.

Each mating beam 530 extends between a proximal end 532 and a distal end 534. The mating beam 530 is flexible and deflectable relative to the base 510. Each mating beam 530 has a corresponding mating interface 536 for mating with the driver circuit card 210. The multiple mating beams 530 thus have multiple points of contact with the driver circuit card 210. The multiple mating beams 530 increase the current carrying capacity, such as compared to a power contact having a single mating beam or simply one pair of the mating beams.

During assembly, the power contact 500 is coupled to the rail member 250, such as to the upper support beam 274 and/or the lower support beam 276. The power contact 500 is plugged into the power contact pocket 262. For example, the base 510 is received in the power contact pocket 262 and the mating beams 530 are received in the channel 272. In various embodiments, the power contact 500 may be held in the power contact pocket 262 by an interference fit. Alternatively, the power contact 500 may be secured in the power contact pocket 262 using adhesive, fasteners, latches, clips, or other securing features.

In an exemplary embodiment, the power contact 500 and the power cable 502 have a low profile for the power driver assembly 200. For example, the power cable 502 may be routed along the upper surface of the rail member 250, such as along the upper support beam 274. Other routing locations are possible in alternative embodiments, such as along the side, the bottom, or internally. The power cable 502 has a small impact on the overall height of the power driver assembly 200. For example, the impact on the overall height is limited to the diameter of the power cable 502. In an exemplary embodiment, the power contact 500 is coupled to the rail member 250 in a manner that has very little or no impact on the overall height and/or width of the power rail 202. For example, the power contact 500 may be received in the power contact pocket 262 such that the power contacts 500 is flush with or recessed into the rail member 250. For example, the upper wall 512 may be flush with or recessed below the upper surface of the upper support beam 274. The end wall 516 may be flush with or recessed into the inner surface 256 of the rail member 250. The lower wall 514 and the mating beams 530 are located within the channel 272 and do not impact the overall height of the power driver assembly 200. In an exemplary embodiment, the power contact 500 is contained within an envelope (for example, height and width) of the rail member 250. For example, the width of the power contact 500 may be less than or equal to the width of the rail member 250. As such, the power contact 500 does not add to the overall dimensions of the power rail 202.

When assembled, the driver circuit card 210 is plugged into the power rail 202. The upper and lower power pads 226 interfaces with the upper and lower mating beam 530*u*, 530l of the power contact 500. The mating beams 530 define multiple points of contact with each power pad 226. The mating beams 530 are configured to be spring loaded against the power pads 226 to ensure a reliable electrical connection between the power contact 500 and the driver circuit card 210.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

What is claimed is:

1. A power rail for powering a power driver assembly, the power rail comprising:
   a rail member extending between a front end and a rear end, the rail member having a track including a channel between an upper support beam and a lower support beam, the track extending between the front end and the rear end, the track configured to receive a driver circuit card of the power driver assembly; and
   a power contact having a base coupled to the rail member, the power contact including a cable termination terminated to a power cable, the power contact including a mating beam extending from the base into the channel of the track, the mating beam having a mating interface configured to be mated to a power pad of the driver circuit card within the channel of the track when the driver circuit card is plugged into the track of the rail member.

2. The power rail of claim 1, wherein the rail member has a width between an inner side and an outer side of the rail member, the power contact and the power cable being contained within the width of the rail member between the inner side and the outer side.

3. The power rail of claim 1, wherein the rail member includes a power contact pocket, the power contact being received in the power contact pocket such that the power contact is contained within an envelope of the rail member.

4. The power rail of claim 1, wherein the power contact is securely coupled to and supported by the rail member.

5. The power rail of claim 1, wherein the cable termination includes a weld pad, the power cable being welded to the weld pad.

6. The power rail of claim 1, wherein the power cable extends along the upper support beam to the cable termination.

7. The power rail of claim 1, wherein the cable termination extends along a top of the upper support beam, the mating beam extending from a bottom of the upper support beam into the channel.

8. The power rail of claim 1, wherein the mating beam is a first mating beam, the power contact including a second mating beam extending from the base into the channel, the first mating beam extending in a first direction, the second mating beam extending in a second direction.

9. The power rail of claim 1, wherein the mating beam extends between a proximal end and a distal end, the mating beam being flexible between the proximal end and the distal ends.

10. The power rail of claim 9, wherein the mating interface is provided at the distal end.

11. The power rail of claim 9, wherein the proximal end engages and is supported by the upper support beam, the distal ends engaging and being supported by the upper support beam.

12. The power rail of claim 1, further comprising a second power contact coupled to the rail member, the second power contact being terminated to a second power cable, the second power contact configured to be mated to a second power pad of the driver circuit card.

13. The power rail of claim 12, wherein the power contact is coupled to the upper support beam, the second power contact being coupled to the lower support beam and extending into the channel to mate to the second power pad on a bottom surface of the driver circuit card.

14. The power rail of claim 12, wherein the power contact and the second power contact our longitudinally offset along the rail member.

15. A power driver assembly for powering a circuit card of a data device, the power driver assembly comprising:
  a driver circuit card having an upper surface extending between a front and a rear, the driver circuit card having a first edge and a second edge extending between the front and the rear, the driver circuit card including a power pad on the upper surface proximate to the first edge;
  a driver connector mounted to the upper surface proximate to the front, the driver connector including a connector housing having a card slot at a front of the connector housing configured to receive the circuit card of the data device, the driver connector including contacts held in the connector housing being terminated to the driver circuit card, the contacts arranged in the card slot to mate with the circuit card of the data device; and
  a power rail for powering the driver circuit card, the power rail including a rail member extending between a front end and a rear end, the rail member having a track including a channel between an upper support beam and a lower support beam, the track extending between the front end and the rear end, the track receiving the driver circuit card in the channel of the track, the power rail including a power contact having a base coupled to the rail member, the power contact including a cable termination terminated to a power cable, the power contact including a mating beam extending from the base into the channel of the track, the mating beam having a mating interface configured to be mated to the power pad of the driver circuit card within the channel of the track when the driver circuit card is plugged into the track of the rail member.

16. The power driver assembly of claim 15, wherein the driver connector has a width between a first side and a second side of the connector housing, the power rail and the power contact being laterally offset relative to the driver connector outside of the width of the driver connector.

17. The power driver assembly of claim 15, wherein the first edge of the driver circuit card is received in the channel, the power pad being located in the channel to mate with the mating beam of the power contact.

18. The power driver assembly of claim 15, wherein the power rail is a first power rail at a first side of the driver circuit card, the power driver assembly further comprising a second power rail at a second side of the driver circuit card, the second power rail including a second rail member and a second power contact coupled to the second rail member, the second power contact configured to be mated to a second power pad of the driver circuit card proximate to the second edge.

19. A communication system comprising:
  a data device having a device circuit card including a card edge having contact pads at the card edge, the device circuit card including an electrical component electrically connected to the contact pads, the device circuit card including a connector module having a separable mating interface configured for mating with a mating electrical connector, the connector module being electrically connected to the electrical component; and
  a power driver assembly for powering the electrical component on the circuit card of the data device, the power driver assembly comprising:
  a driver circuit card having an upper surface extending between a front and a rear, the driver circuit card having a first edge and a second edge extending between the front and the rear, the driver circuit card including a power pad on the upper surface proximate to the first edge;
  a driver connector mounted to the upper surface proximate to the front, the driver connector including a connector housing having a card slot at a front of the connector housing, the card slot receiving the card edge of the circuit card of the data device, the driver connector including contacts held in the connector housing being terminated to the driver circuit card, the contacts arranged in the card slot to mate with the contact pads of the circuit card of the data device; and
  a power rail for powering the driver circuit card, the power rail including a rail member extending between a front end and a rear end, the rail member having a track including a channel between an upper support beam and a lower support beam, the track extending between the front end and the rear end, the track receiving the driver circuit card, the power rail including a power contact having a base coupled to the rail member, the power contact including a cable termination terminated to a power cable, the power contact including a mating beam extending from the base into the channel, the mating beam having a mating interface configured to be mated to the power pad of the driver circuit card when the driver circuit card is plugged into the track of the rail member;
  wherein the power from the power contact is supplied to the device circuit card through the driver circuit card and the driver connector to power the electrical component on the circuit card of the data device.

20. The communication system of claim 19, wherein the power rail is a first power rail at a first side of the driver circuit card, the power driver assembly further comprising a second power rail at a second side of the driver circuit card, the second power rail including a second rail member and a second power contact coupled to the second rail member, the second power contact configured to be mated to a second power pad of the driver circuit card proximate to the second edge.

* * * * *